(12) United States Patent
Suzuki et al.

(10) Patent No.: US 7,832,264 B2
(45) Date of Patent: Nov. 16, 2010

(54) TIRE SENSOR SYSTEM AND VEHICLE BODY HAVING THE SAME MOUNTED THEREON

(75) Inventors: Hirohisa Suzuki, Ora-Gun (JP); Eiichiro Kuwako, Ohta (JP); Takashi Kunimi, Tokyo (JP)

(73) Assignees: Sanyo Electric Co., Ltd., Osaka (JP); Akebono Brake Industry Co., Ltd., Tokyo (JP)

( * ) Notice: Subject to any disclaimer, the term of this patent is extended or adjusted under 35 U.S.C. 154(b) by 323 days.

(21) Appl. No.: 11/918,957

(22) PCT Filed: Apr. 17, 2006

(86) PCT No.: PCT/JP2006/308028

§ 371 (c)(1),
(2), (4) Date: Oct. 22, 2007

(87) PCT Pub. No.: WO2006/118010

PCT Pub. Date: Nov. 9, 2006

(65) Prior Publication Data

US 2009/0031794 A1   Feb. 5, 2009

(30) Foreign Application Priority Data

Apr. 26, 2005 (JP) ............................. 2005-128129

(51) Int. Cl.
*B60C 23/02* (2006.01)
(52) U.S. Cl. .................................................. 73/146.5
(58) Field of Classification Search ........................ None
See application file for complete search history.

(56) References Cited

U.S. PATENT DOCUMENTS

| | | | |
|---|---|---|---|
| 6,763,288 B2* | 7/2004 | Caretta et al. ................... 701/1 |
| 7,026,977 B2* | 4/2006 | Reindl ........................... 342/71 |
| 7,076,998 B2* | 7/2006 | Bulst et al. ..................... 73/146 |
| 7,145,446 B2* | 12/2006 | Katou ........................... 340/448 |
| 7,268,678 B2* | 9/2007 | Chakam et al. ............... 340/442 |
| 7,289,022 B2* | 10/2007 | Ogawa et al. ................. 340/447 |
| 7,302,836 B2* | 12/2007 | Hattori .......................... 73/146 |

(Continued)

FOREIGN PATENT DOCUMENTS

JP  A 2002-243554  8/2002

(Continued)

*Primary Examiner*—Lisa M Caputo
*Assistant Examiner*—Jermaine Jenkins
(74) *Attorney, Agent, or Firm*—Oliff & Berridge, PLC

(57) ABSTRACT

The position of the rotation of a tire complicates the establishing of a wireless connection between a sensor unit attached to the tire and a sensor control unit attached to a vehicle body.

A reflection plate is attached to an inner surface of a wheel housing at a position different from that of a sensor control unit. A transmission electromagnetic field from the sensor control unit is reflected by the metal reflection plate and transmitted to a sensor unit rotated to a position to which the field does not readily reach directly from the sensor control unit. The sensor unit varies an impedance of a coil antenna in accordance with transmission data, and generates a variation in the transmission electromagnetic field. The variation is detected via the reflection plate as a variation in a transmission load of the sensor control unit, and the transmission data from the sensor unit is detected in the sensor control unit.

8 Claims, 3 Drawing Sheets

U.S. PATENT DOCUMENTS

| | | | |
|---|---|---|---|
| 7,336,164 B2 * | 2/2008 | Apostolopoulos et al. | 340/447 |
| 7,385,492 B2 * | 6/2008 | Hattori | 340/442 |
| 7,469,580 B2 * | 12/2008 | Suzuki et al. | 73/146.5 |
| 2001/0004236 A1 | 6/2001 | Letkomiller et al. | |

FOREIGN PATENT DOCUMENTS

| | | |
|---|---|---|
| JP | A 2003-165465 | 6/2003 |
| JP | A 2004-163134 | 6/2004 |
| JP | A 2004-244851 | 9/2004 |
| JP | A 2005-88781 | 4/2005 |
| JP | A 2005-349905 | 12/2005 |
| JP | A 2006-20460 | 1/2006 |
| JP | A 2006-186945 | 7/2006 |

* cited by examiner

TIRE SENSOR SYSTEM AND VEHICLE BODY HAVING THE SAME MOUNTED THEREON

TECHNICAL FIELD

The present invention relates to a tire sensor system in which output of a sensor disposed in a tire of an automotive vehicle or the like can be used on a vehicle body side, and to a vehicle body having the system mounted thereon.

BACKGROUND ART

There is a trend in the United States in recent years in mandating that a tire air pressure monitoring system be mounted in automotive vehicles. Conventionally, there are systems that do not require a battery because of the use of a surface acoustic wave (SAW) device as a method for directly measuring the air pressure of a tire.

An RFID (Radio Frequency Identification) technique is known in which a wireless connection is provided between a tire-mounted pressure sensor and a controller on the vehicle body. In a configuration that uses this RFID technique, an RFID transponder (RF tag) containing an inflation pressure sensor is disposed in the internal space of the tire, and a reader/writer is disposed on the vehicle body. For the sake of convenience, methods for achieving the wireless connection between the two members are categorized, in accordance with fluctuation frequency and transmission distance of the electromagnetic field, into electromagnetic wave methods, electromagnetic induction methods, and electromagnetic coupling methods. However, the methods are performed using fluctuations in the electromagnetic field and are essentially physically the same.

DISCLOSURE OF THE INVENTION

Problem to be Solved by the Invention

When a rotational position of a tire is positioned so that an RFID transponder is near to a reader/writer, the RFID transponder in the tire and the reader/writer of a vehicle body can be preferably connected directly by an electromagnetic field. However, when the tire rotates from that position, the wireless connection between the members cannot readily be made due to, e.g., an increase in the distance between the members, an increase in the amount of component members of the tire between the two members, and a deviation in the directional characteristics of a coil constituting antennas of both of the members; and a problem will be presented in that the vehicle body side will be unable to acquire results of detections made by the sensor. On the other hand, when attempts are made to the increase transmission output of the RFID transponder, a problem will arise in that the amount of electricity consumed will increase.

The present invention resolves the foregoing problems, and it is an object thereof to provide a tire sensor system in which output of a sensor in a tire can be detected at a high sensitivity while using low amounts of energy regardless of a rotational position of the tire; and a vehicle body having the system mounted thereon.

Means for Solving the Problem

The present invention provides a tire sensor system in which a control unit disposed in a vehicle body and a sensor unit disposed inside a tire attached to the vehicle body are wirelessly connected, comprising a reflection member attached to the vehicle body; wherein the control unit generates a transmission electromagnetic field that varies with time and senses electromagnetic field fluctuations produced by the sensor unit; the sensor unit has a sensor for measuring a target value in the tire, a response circuit for generating transmission alternating current modulated in accordance with the output of the sensor, and a coil antenna for generating electromagnetic field fluctuations on the basis of the transmission alternating current; and the reflection member reflects the transmission electromagnetic field from the control unit, and relays the wireless connection between the control unit and the sensor unit.

A suitable mode of the present invention is a tire sensor system in which the reflection member is disposed on an inside surface of a wheel housing of the vehicle body.

Another suitable mode of the present invention is a tire sensor system in which the reflection member is a metallic plate.

A vehicle body according to the present invention comprises a control unit wirelessly connected to a sensor unit disposed on an attached tire, wherein the vehicle body has a reflection member attached at a predetermined position on the vehicle body; the control unit generates a transmission electromagnetic field that varies with time and detects fluctuations in the electromagnetic field created by the sensor unit; and the reflection member reflects the transmission electromagnetic field from the control unit, and relays the wireless connection between the control unit and sensor unit.

A suitable mode of the present invention is a vehicle body in which the reflection member is disposed on an inside surface of the wheel housing of the vehicle body.

Another suitable mode of the present invention is a vehicle body in which the reflection member is a metallic plate.

EFFECT OF THE INVENTION

According to the present invention, the transmission electromagnetic field is relayed and propagated between the control unit and sensor unit by the reflection member. Accordingly, a tire or another attenuating member situated on a direct pathway between the control unit and the sensor unit can be circumvented and the directional characteristics of the coil antenna of the sensor unit and the direction of propagation of the transmission electromagnetic field can be matched to one another, and a wireless connection can more suitably be realized between the control unit and the sensor unit.

BEST MODE FOR CARRYING OUT THE INVENTION

Examples (hereinafter referred to as "embodiments") of the present invention are described below with reference to the drawings.

Figure 1:
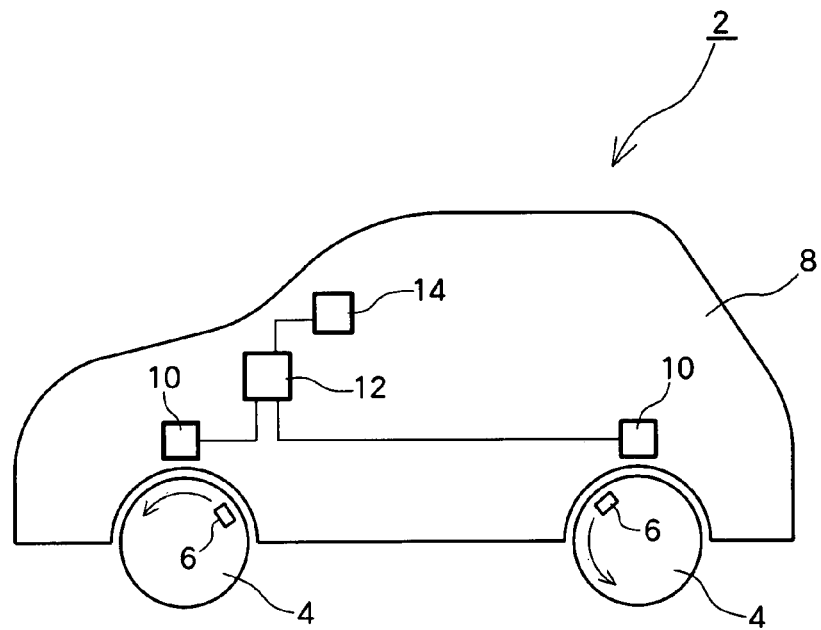
FIG. 1 is schematic view showing a schematic configuration of a tire pressure detecting system according to an embodiment.

FIG. 1 is a schematic diagram showing the general configuration of a tire inflation pressure determining system for determining the tire air pressure of an automotive vehicle or another vehicle. The present system is composed of a booster antenna (not shown) and a sensor unit 6 mounted on each tire 4 of an automotive vehicle 2, and a sensor control unit 10 mounted in a position near each tire 4 attached to the vehicle body 8. The sensor units 6 and the sensor control units 10 are wirelessly connected. The sensor unit 6 determines the air pressure of a mounted tire and transmits the data. The sensor control unit 10 determines the data transmitted by the sensor units 6, and notifies, e.g., the ECU or other vehicle control unit 12. The vehicle control unit 12 can control the operation of the vehicle in accordance, e.g., with tire air pressure, and display the measurement results of the tire air pressure on a display device 14 to notify the driver.

Figure 2:
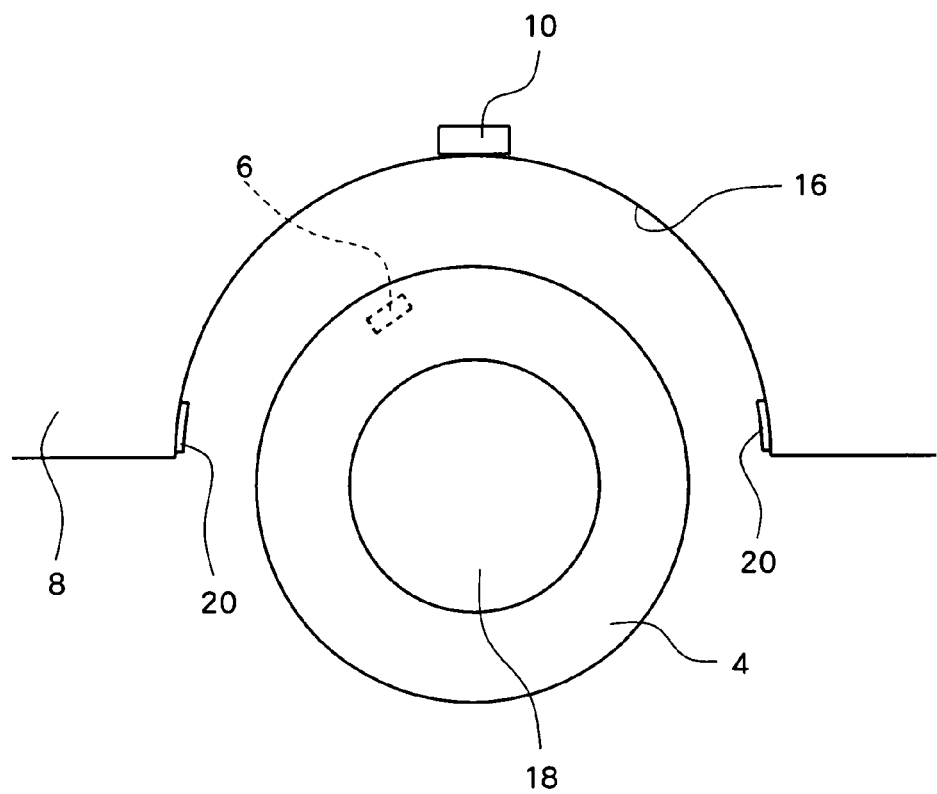
FIG. 2 is a schematic view of a portion that relates to a tire and wheel housing according to the embodiment.

FIG. 2 is a schematic view of a portion that relates to the tires 4 and wheel housing 16 of the automotive vehicle 2, and is a view seen from a side of the vehicle. The sensor unit 6 is attached to an inner surface of the tire 4 that is attached to a wheel 18. For example, the sensor unit 6 is fastened to a bottom surface inside of the tire. For example, the sensor unit 6 can be formed in a planar fashion on a flexible substrate. A coil antenna thereof is formed so that the substrate and a plane of an opening of the coil match. Accordingly, the plane of the opening of the coil antenna of the sensor unit 6 is oriented in a radial direction of the tire. The sensor unit 6 will thereby have dipolar directional characteristics in which the radial direction is a maximum direction. In the vehicle body 8, the sensor control unit 10 is attached to, e.g., a top part of the wheel housing. The coil antenna of the sensor control unit 10 is disposed so that the plane of the opening thereof will be oriented in a vertical direction. The antenna has dipolar directional characteristics in which the vertical direction is the maximum direction. A reflection plate 20 is attached to an inside surface of a lower end part of the wheel housing. Reflective surface of the reflecting plate 20 is oriented in accordance with the position of the sensor control unit 10 and a desired reflection direction. When the sensor unit 6 is present in the vicinity of the top part, the sensor control unit 10 is magnetically coupled directly with the sensor unit 6. On the other hand, when the sensor unit 6 is distanced from the top part and moved to a side part and lower part of the tire in FIG. 2, deviation will occur in the orientations of the coil antennas of the sensor unit 6 and sensor control unit 10, and the tire 4 present between the two members will cause attenuation, whereby the two members will not readily be directly coupled. In such instances, the portion of the electromagnetic field emitted from the sensor control unit 10 that is reflected by the reflection plate 20 is received by the sensor unit 6, and the electromagnetic coupling of the two members can be realized by the electromagnetic field relayed by the reflection plate 20.

Figure 3:
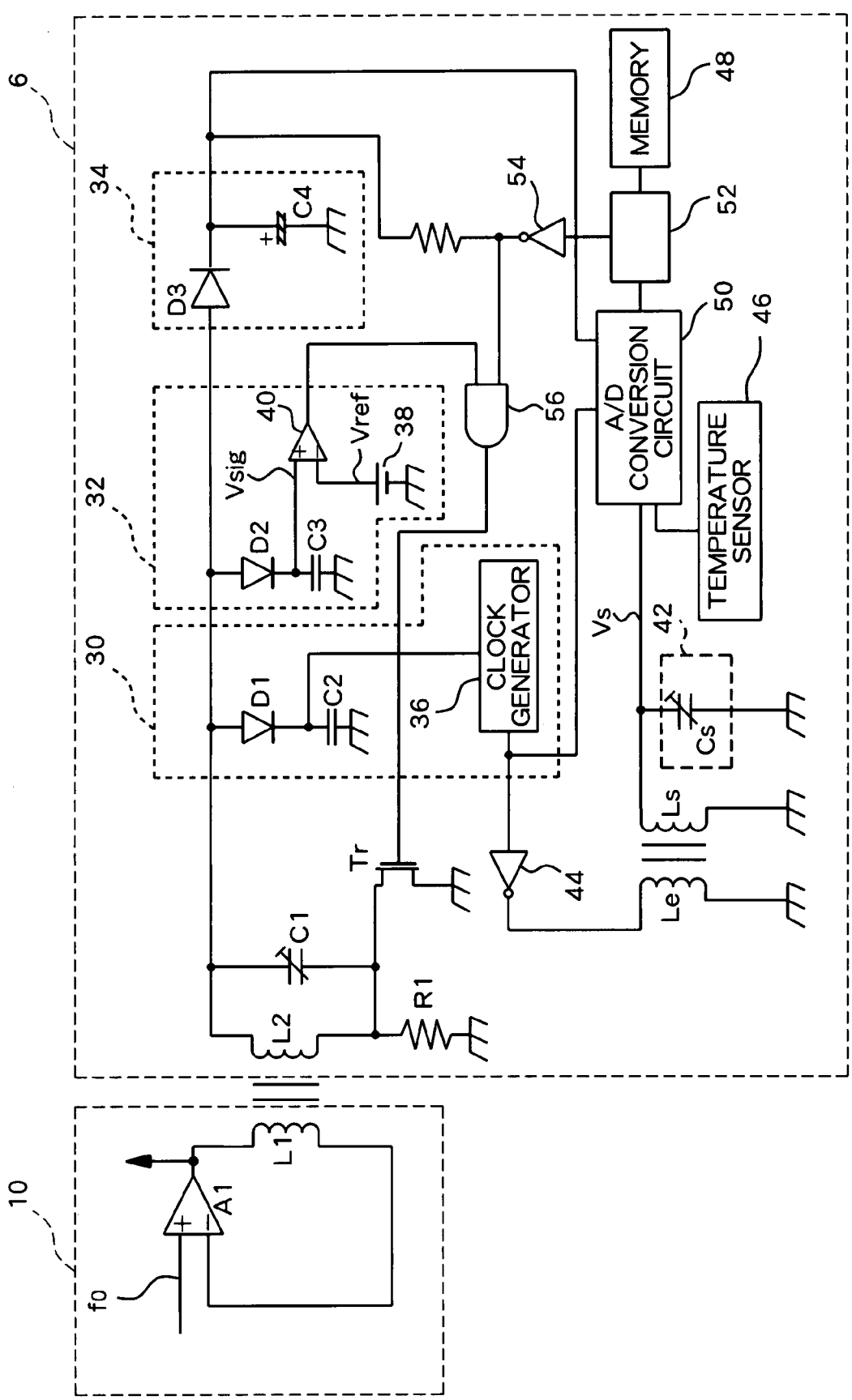
FIG. 3 is a schematic circuit diagram of a sensor unit and a sensor control unit of the embodiment.

FIG. 3 is a schematic circuit diagram of the sensor unit 6 and sensor control unit 10. The sensor control unit 10 is composed of a coil L1 that is a coil antenna, and an operational amplifier A1. The operational amplifier A1 is configured so that the amplifier output and one of the input terminals are connected via the coil L1, and the amplifier generates AC current having a frequency f0 in the coil L1 in accordance with the clock having the frequency f0 fed to the other of its input terminals. The coil L1 determines magnetic field fluctuations generated by the sensor unit 6 and converts the fluctuations into voltage. Specifically, the voltage variations having the frequency f0, which are fed from the operational amplifier A1 to the coil L1, are amplitude-modulated in accordance with the data sent from the sensor unit 6. For example, the voltage of the output terminal of the operational amplifier A1 is brought out as the output voltage of the coil L1. The sensor control unit 10 detects voltage variations of the output terminal of the operational amplifier A1, extracts data sent from the sensor unit 6, and presents the data to the vehicle control unit 12.

The sensor unit 6 has a coil L2 as a coil antenna, and is wirelessly connected to the sensor control unit 10 via an electromagnetic field between the coil L2 and the coil L1. For example, in the present system, a wireless connection is realized utilizing direct transformer coupling between the two members when the coil L1 and coil L2 approach one another, and indirect transformer coupling via the reflection plate 20. In the sensor control unit 10, when the coil L1 generates fluctuations in the magnetic field of the frequency f0, a current voltage having the frequency f0 is generated at both ends of the transformer coupled coil L2.

A capacitor C1 is connected in parallel to the coil L2. The coil and capacitor form a parallel LC resonance circuit. The capacitance of the capacitor C1 is set so that the resonance frequency of the parallel LC resonance circuit is f0. The configuration of the LC resonance circuit allows the coil L2 to create a resonance effect in the frequency f0 component generated by the sensor control unit 10 in the external AC electromagnetic field, and to amplify the voltage amplitude of the alternating current generated at the two ends of the coil L2. One of the terminals of the coil L2 is grounded via a resistance R1 and is connected to a later-described transistor Tr.

A clock generation circuit 30, a level-sensing circuit 32, and a power circuit 34 are connected to the other terminal of the coil L2.

The clock generation circuit 30 is composed of a diode D1, a capacitor C2, and a clock generator 36. One terminal of the diode D1 is connected to the coil L2, and the other terminal is connected to one of the terminals of the capacitor C2 and to the clock generator 36. The other terminal of the capacitor C2 is grounded. Alternating current generated by the coil L2 is inputted to the diode D1 and is half-wave rectified and outputted. Since the capacitor C2 has relatively low capacitance and the smoothing effect of the capacitor C2 is low, a voltage signal that fluctuates in accordance with the frequency f0 outputted from the diode D1 is inputted to the clock generator 36. The clock generator 36 receives this voltage signal as a reference signal and generates and outputs a clock signal in correspondence with the cycle thereof. For example, the clock generator 36 outputs a clock signal having the same frequency f0 as the reference signal. The clock generator 36 may also be configured to generate and output a clock signal having a frequency obtained by dividing the reference signal.

The level-sensing circuit 32 is composed of a diode D2, a capacitor C3, a reference voltage source 38, and a comparator 40. One terminal of the diode D2 is connected to the coil L2, and the other terminal is connected to one of the terminals of the capacitor C3 and to the comparator 40. The other terminal of the capacitor C3 is grounded. Alternating current generated by the coil L2 is inputted to the diode D2 and is half-wave rectified and outputted. The capacitor C3 has a capacitance sufficient to smooth the fluctuations of a relatively high frequency f0, e.g., several 100 kHz to several 10 kHz. In other words, the diode D2 and capacitor C3 detect voltage signals having a frequency f0 produced in the coil L2, and draw out the amplitude-modulated component. As a result, voltage fluctuations having a lower frequency than the frequency f0 that appears in the output of the diode D2 are drawn out from the capacitor C3, and this is inputted to one of the terminals of the comparator 40. In the present system, such fluctuations at low frequencies can be produced by periodic variations in the positional relationship of the sensor unit 6 and sensor control unit 10 due to the rotation of the tire 4 on which the sensor unit 6 is mounted.

The comparator 40 compares a voltage signal Vsig from the capacitor C3 inputted to one of the terminals, and a constant voltage Vref inputted from the reference voltage source 38 to the other terminal, outputs an H level voltage that corresponds to a digital value of "1" when the Vsig is at the threshold voltage Vref or higher, and outputs an L level voltage that corresponds to a digital value of "0" when Vsig is less than Vref. The output of the comparator 40 is used for transmitting data to be sent only when the sensor unit 6 has been suitably wirelessly connected to the sensor control unit 10. To this end, the voltage Vref of the reference voltage source 38 is set in advance based on the value of Vsig when the coil L2 of the sensor unit 6 and the coil L1 of the sensor control unit 10 are transformer coupled together. The reference voltage source 38 may be configured via a regulator circuit or the like.

The power circuit 34 is composed of a diode D3 and a capacitor C4, and feeds power that is required for each part of the sensor unit 6. The diode D3 is disposed between the input and output terminals of the power circuit 34, and one of the terminals of the capacitor C4 is connected to the output terminal of the power circuit 34. The other terminal of the capacitor C4 is grounded. The input terminal of the power circuit 34 is connected to the coil L2. The diode D3 rectifies the alternating current from the coil L2, and the capacitor C4 is charged by the output of the diode D3. The capacitor C4 is composed of an electrolytic capacitor or another capacitor that has a large capacitance. The capacitor C3 smoothes and rectifies the output of the diode D3 and outputs the rectified current from the power circuit 34.

The sensor unit 6 is provided with an inflation pressure sensor 42 that determines the air pressure of a tire. The inflation pressure sensor 42 is a capacitance inflation pressure sensor and is a sensor element that varies the electrical capacitance Cs in accordance with inflation pressure P. The capacitance Cs of the inflation pressure sensor 42 and the coil Ls together constitute a parallel LC resonance circuit. The coil Ls is transformer coupled to the coil Le. The coil Le receives as input the clock generated by the clock generator 36 by way of a buffer circuit 44.

Figure 4:
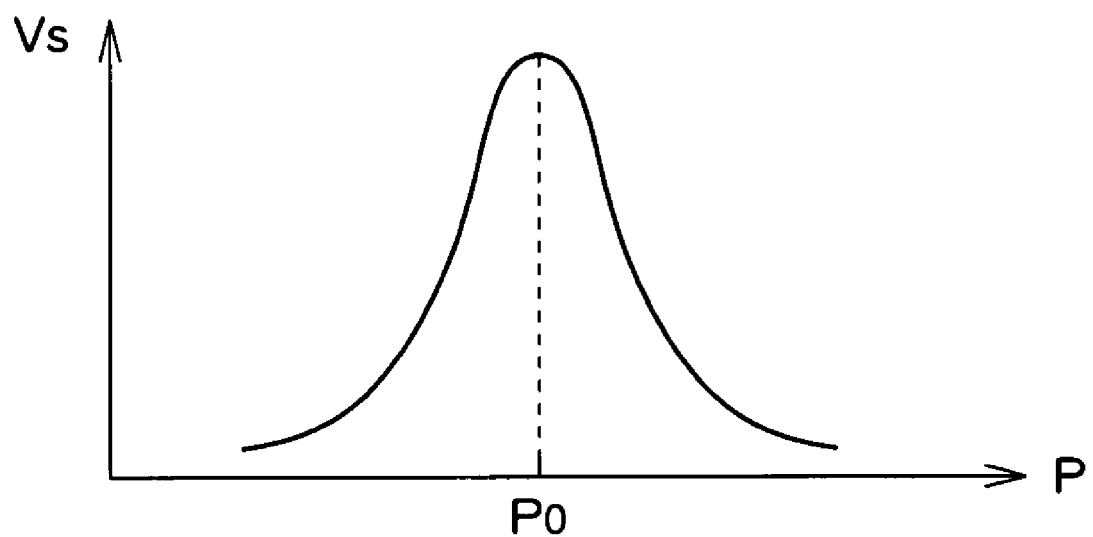
FIG. 4 is a schematic graph showing the variation of output voltage Vs of an LC resonance circuit, which is composed of the coil LS and the capacitance Cs, with respect to the air pressure P of the tire.

FIG. 4 is a schematic graph showing the variation of output voltage Vs of an LC resonance circuit, which is composed of the coil Ls and the capacitance Cs, with respect to the air pressure P of the tire. The LC resonance circuit is configured so as to resonate at the frequency of the output clock of the clock generator 36 and to cause the voltage Vs to reaches a maximum with respect to the value the capacitance Cs at the reference inflation pressure P0. The voltage Vs decreases as the air pressure P becomes offset from the reference inflation pressure P0. For example, a configuration may be adopted in which the reference inflation pressure P0 is set to the central value of an inflation pressure range that is deemed to be normal, and the vehicle control unit 12 is considered to be normal when the voltage Vs is at a predefined threshold value or higher.

The sensor unit 6 may be provided with a temperature sensor 46 and a memory 48.

The output voltage Vs of the LC resonance circuit and the output voltage of the temperature sensor 46 are inputted to an A/D (Analog-to-Digital) A/D conversion circuit 50. The A/D conversion circuit 50 converts these analog input signals into digital data. The A/D conversion circuit 50 is supplied with driving power from the power circuit 34, and may be configured so as to use the output clock of the clock generator 36 in the A/D conversion processing.

The type and manufacture date of the tire, and other information related to the tire on which the sensor unit 6 is mounted are stored in the memory 48 in advance.

The transmission data generation circuit 52 reads the information from the memory 48 and generates transmission data stored in a predefined format. This data is composed of data that expresses the information and data that is output from the A/D conversion circuit 50. The transmission data generation circuit 52 switches between an H level and an L level in accordance with the bit sequence constituting the transmission data.

The output of the transmission data generation circuit 52 is inputted to one of the terminals of an AND gate 56 via a buffer circuit 54. The output of the level-sensing circuit 32 is inputted to the other terminal of the AND gate 56. The AND gate 56 allows transmission data that contains inflation pressure data and the like to pass through only when the output of the level-sensing circuit 32 is at an H level.

The output of the AND gate 56 is presented to a gate of a transistor Tr. For example, the transistor Tr is switched on when the output of the AND gate 56 is at an H level, and the coil L2 is grounded via the transistor Tr. On the other hand, the transistor Tr is switched off when the output of the AND gate 56 is at an L level, and the coil L2 is grounded via the resistor R1. With this configuration, the impedance of the coil L2 is reduced more when the transistor Tr is on than when the transistor Tr is off.

Variation in the impedance of the coil L2 causes fluctuations in the electromagnetic field that couples the coils L1, L2, and affects the voltage between the terminals of the coil L1 nearer the sensor control unit 10. Specifically, the sensor control unit 10 can, with the aid of the coil L1, sense as voltage variation the fluctuations in the electromagnetic field that are generated by the sensor unit 6 in accordance with the transmission data. The sensor control unit 10 reproduces the transmission data from the sensor unit 6 by detecting the voltage variation superimposed on the carrier of the frequency f0, and outputs the result to the vehicle control unit 12. Therefore, even when the coils L1, L2 are magnetically coupled via the reflection plate 20, variations in the impedance of the coil L2 in the sensor control unit 10 can be detected. Specifically, in such instances, variations in the impedance of the coil L2 cause fluctuations in the electromagnetic field between the reflection plate 20 and the coil L2. These fluctuations create, via the reflection plate 20, fluctuations in the electromagnetic field between the reflection plate 20 and the coil L1. Thus, even in such instances, the transmission data from the sensor unit 6 can be received by the sensor control unit 10.

The reflective surface of the reflection plate 20 can be made flat. In addition, e.g., when the surface is given a concave shape oriented toward the tire, as in a parabolic antenna, to focus the fluctuations in the electromagnetic field, and the sensor unit 6 has rotated near to a focal point thereof, a suitable electromagnetic coupling will be formed between the sensor unit 6 and the sensor control unit 10.

The invention claimed is:

1. A tire sensor system in which a control unit disposed in a vehicle body and a sensor unit disposed inside a tire attached to the vehicle body are wirelessly connected, the tire sensor system comprising:
    a reflection member attached to the vehicle body and disposed outside the tire; wherein
    the control unit generates a transmission electromagnetic field that varies with time and senses electromagnetic field fluctuations produced by the sensor unit;
    the sensor unit has:

a sensor for measuring a target value in the tire, a response circuit for generating transmission alternating current modulated in accordance with the output of the sensor, and a coil antenna for generating electromagnetic field fluctuations on the basis of the transmission alternating current; and the reflection member reflects the transmission electromagnetic field from the control unit, and relays the wireless connection between the control unit and the sensor unit.

2. The tire sensor system of claim 1, wherein the reflection member is disposed on an inside surface of a wheel housing of the vehicle body.

3. The tire sensor system of claim 2, wherein the reflection member is a metallic plate.

4. The tire sensor system of claim 1, wherein the reflection member is a metallic plate.

5. A vehicle body comprising a control unit wirelessly connected to a sensor unit disposed on an attached tire, the vehicle body comprising:

a reflection member attached at a predetermined position on the vehicle body and outside the tire; wherein the control unit generates a transmission electromagnetic field that varies with time and detects fluctuations in the electromagnetic field created by the sensor unit; and the reflection member reflects the transmission electromagnetic field from the control unit, and relays the wireless connection between the control unit and sensor unit.

6. The vehicle body of claim 5, wherein the reflection member is disposed on an inside surface of a wheel housing of the vehicle body.

7. The vehicle body of claim 6, wherein the reflection member is a metallic plate.

8. The vehicle body of claim 5, wherein the reflection member is a metallic plate.

* * * * *